United States Patent
Bertoni et al.

(10) Patent No.: US 10,364,946 B1
(45) Date of Patent: Jul. 30, 2019

(54) SMART BULB SYSTEM

(71) Applicant: STMicroelectronics S.r.l., Agrate Brianza (IT)

(72) Inventors: Guido Marco Bertoni, Bernareggio (IT); Massimo Ratti, Bernareggio (IT)

(73) Assignee: STMicroelectronics S.r.l., Agrate, Brianza (IT)

( * ) Notice: Subject to any disclaimer, the term of this patent is extended or adjusted under 35 U.S.C. 154(b) by 0 days.

(21) Appl. No.: 15/895,253

(22) Filed: Feb. 13, 2018

(51) Int. Cl.
| | |
|---|---|
| *F21K 9/64* | (2016.01) |
| *F21K 9/232* | (2016.01) |
| *F21K 9/235* | (2016.01) |
| *F21K 9/237* | (2016.01) |
| *F21K 9/238* | (2016.01) |
| *F21V 14/04* | (2006.01) |
| *G08C 17/02* | (2006.01) |
| *H05B 37/02* | (2006.01) |
| *F21Y 115/30* | (2016.01) |

(52) U.S. Cl.
CPC .............. *F21K 9/64* (2016.08); *F21K 9/232* (2016.08); *F21K 9/235* (2016.08); *F21K 9/237* (2016.08); *F21K 9/238* (2016.08); *F21V 14/04* (2013.01); *G08C 17/02* (2013.01); *H05B 37/0218* (2013.01); *H05B 37/0227* (2013.01); *H05B 37/0272* (2013.01); *F21Y 2115/30* (2016.08); *G08C 2201/93* (2013.01)

(58) Field of Classification Search
CPC . F21K 9/64; F21K 9/238; F21K 9/232; F21K 9/235; F21K 9/237; F21V 14/04; G08C 17/02; H05B 37/0218; H05B 37/0227; H05B 37/0272

See application file for complete search history.

(56) References Cited

U.S. PATENT DOCUMENTS

| | | | | |
|---|---|---|---|---|
| 2009/0134802 | A1* | 5/2009 | Oketani | A47F 3/001 315/84 |
| 2012/0286673 | A1* | 11/2012 | Holland | H05B 33/0854 315/155 |

(Continued)

OTHER PUBLICATIONS

Denault, Kristin A., et al: "Efficient and Stable Laser-Driven White Lighting," AIP Advances 3, 072107 (2013); doi: 10.1063/1.4813837 (7 pages).

(Continued)

*Primary Examiner* — Dedei K Hammond
*Assistant Examiner* — Raymond R Chai
(74) *Attorney, Agent, or Firm* — Crowe & Dunlevy

(57) ABSTRACT

Disclosed herein is a lighting system including a bulb. The bulb includes a phosphor plate, and a scanning projector to emit a beam of collimated light and scan the beam of collimated light across the phosphor plate to thereby cause emission of light by portions of the phosphor plate impinged upon by the beam of collimated light. Control circuitry wirelessly receives configuration data and modulates the beam of collimated light during scanning so that the scanning forms a projection pattern on the phosphor plate. A control system is spaced apart from the bulb and processes the initial configuration data, and wirelessly sends the configuration data to the control circuitry of the bulb. A mobile wireless communications device wirelessly sends initial configuration data to the control system.

28 Claims, 10 Drawing Sheets

(56) References Cited

U.S. PATENT DOCUMENTS

| | | | |
|---|---|---|---|
| 2013/0200785 A1* | 8/2013 | Yano | H05B 33/02 |
| | | | 313/512 |
| 2014/0192206 A1* | 7/2014 | Holz | H04N 5/23241 |
| | | | 348/169 |
| 2014/0267716 A1* | 9/2014 | Child | H04N 7/186 |
| | | | 348/143 |
| 2016/0299061 A1* | 10/2016 | Goldring | G01J 3/0275 |
| 2017/0052289 A1* | 2/2017 | Boissevain | F21V 33/0016 |
| 2017/0085768 A1* | 3/2017 | Van Der Sijde | H04N 5/2354 |
| 2017/0104972 A1* | 4/2017 | Novotny | H04N 9/77 |
| 2017/0188434 A1* | 6/2017 | Yuh | H05B 37/0218 |

OTHER PUBLICATIONS

Wallace, John: "Semiconductor Sources: Laser Plus Phosphor Emits White Light Without Droop," https://www.laserfocusworld.com/articles/print/volume-49/issue-11/world-news/semiconductor-sources-laser-plus-phosphor-emits-white-light-without-droop . . . (3 pages).

IRDC2 Excitation & Emission, LDP LLC, https://www.maxmax.com/phosphorsdyesandinks/infrared-phosphors-dyes-and-inks/infrared-down-conversion-powder/irdc2, copyright 1997 (1 page).

Buckley, Edward: "Eye-Safety Analysis of Current Laser-Based Scanned-Beam Projection Systems," Journal of the SID 18/11, 2010 (pp. 944-951).

Buckley, Dr. Edward: "On Proximity Detection Systems for Pico-Projectors," Journal of the SID 20/6, 2012 (pp. 297-299).

* cited by examiner

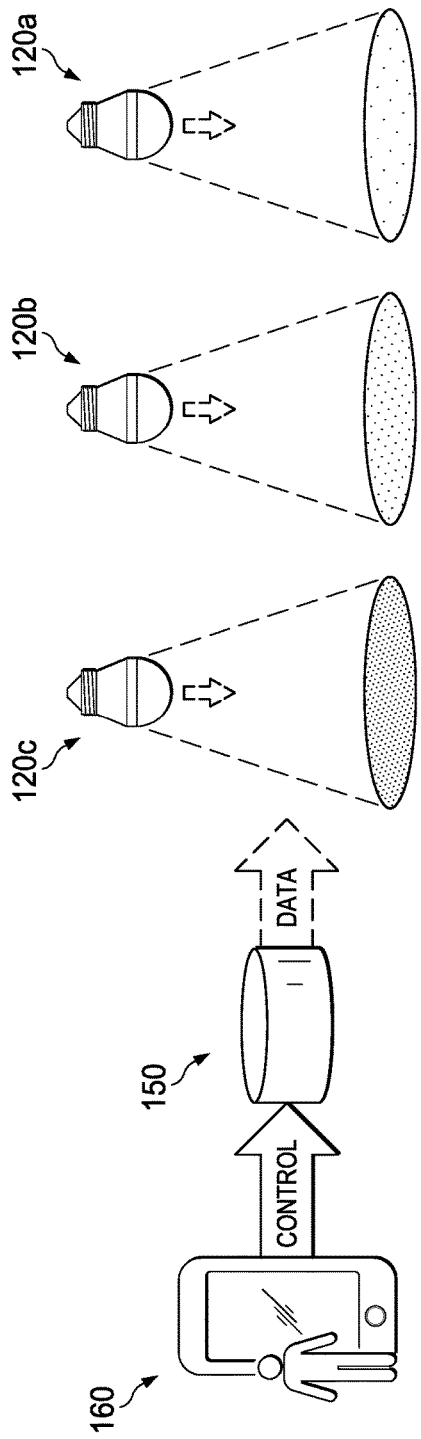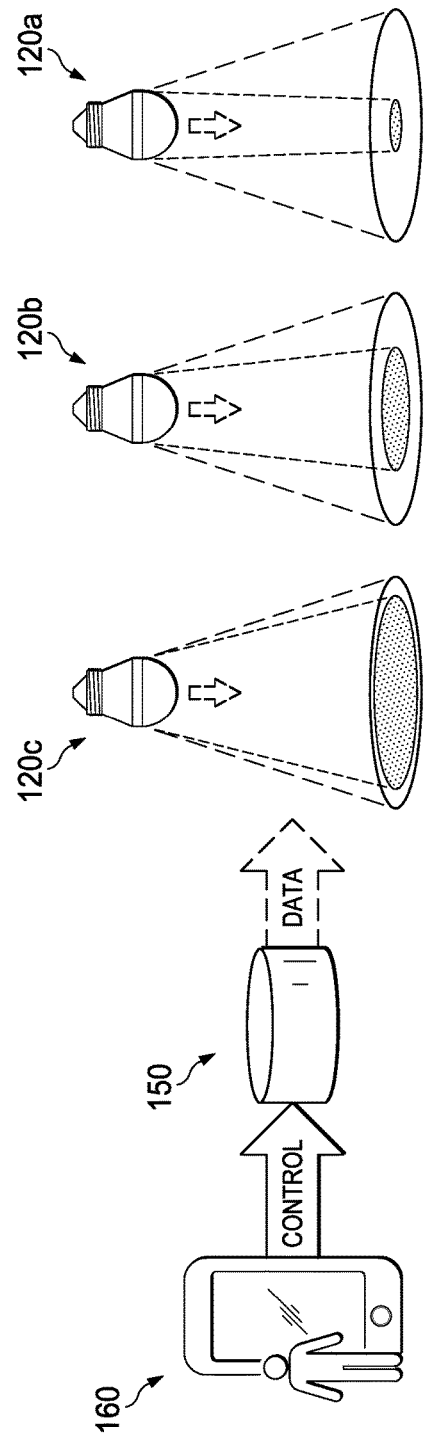

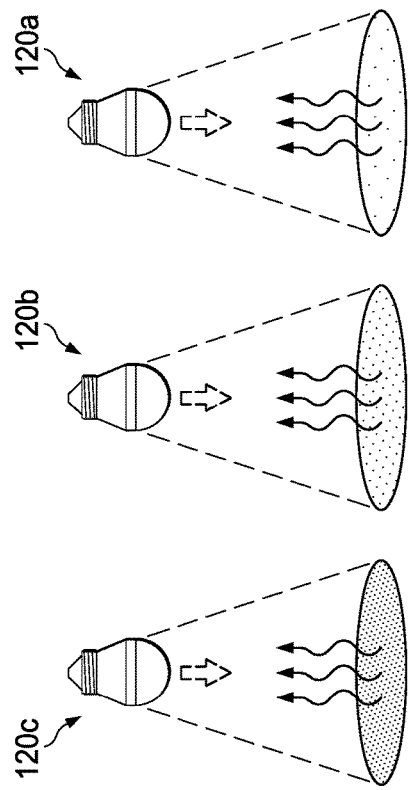
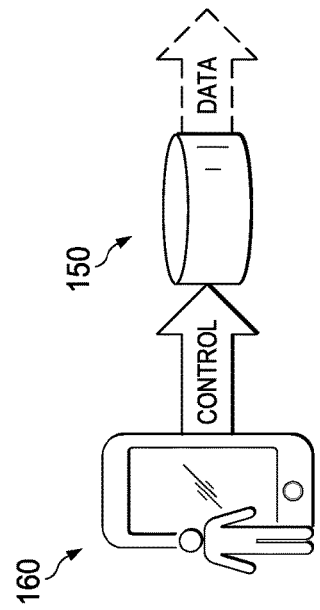
FIG. 12
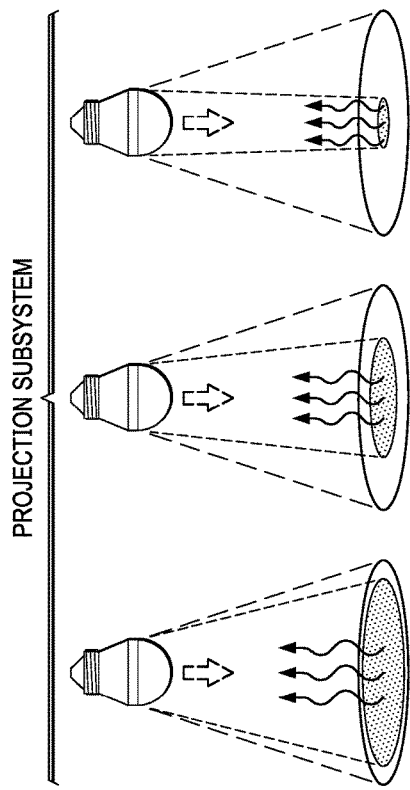
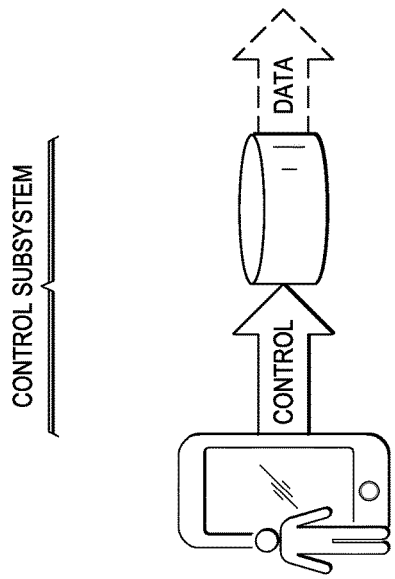
FIG. 13

SMART BULB SYSTEM

TECHNICAL FIELD

This disclosure is related to a "smart" lighting system that utilizes a directable beam of collimated light to cause emission of non-collimated light by a phosphor plate.

BACKGROUND

"Smart" home systems are increasingly popular with consumers. Smart home systems may include devices such as security cameras, electronic door locks, and lighting systems. Such smart lighting systems typically include features like enabling activation of lights remotely via a smartphone, the setting of a schedule for activation of lights, or the use of proximity sensors for activation of lights.

While these smart lighting systems are popular with consumers, they nevertheless are unable to satiate all commercial desires. For example, while smart lighting systems that can direct light toward specific areas may exist, those smart lighting systems use mechanical arrangements of motors and gears to aim a light source toward the desired specific area. Although this does achieve the goal, the amount of physical space taken up by the motors and gears to provide the desired degree of aimability is undesirable, often rendering such lighting systems unusable with conventional lighting fixtures.

Therefore, further development into the area of smart lighting systems so as to satisfy long felt commercial needs is desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

FIG. 5 is a diagram of the smart lighting system of FIG. 4 when operating in a dimming mode.

FIG. 6 is a diagram of the smart lighting system of FIG. 4 when operating in a beam spot size alteration mode.

FIG. 12 is a diagram of the smart lighting system of FIG. 4, operating as a heater, when operating in a heat dimming mode.

FIG. 13 is a diagram of the smart lighting system of FIG. 4, operating as a heater, when operating in a heat beam size alteration mode.

DETAILED DESCRIPTION

A smart lighting system will be described in full herein below, however, first the "smart" bulb components of the smart lighting system will be described with reference to FIGS. 1-3.

Figure 1:
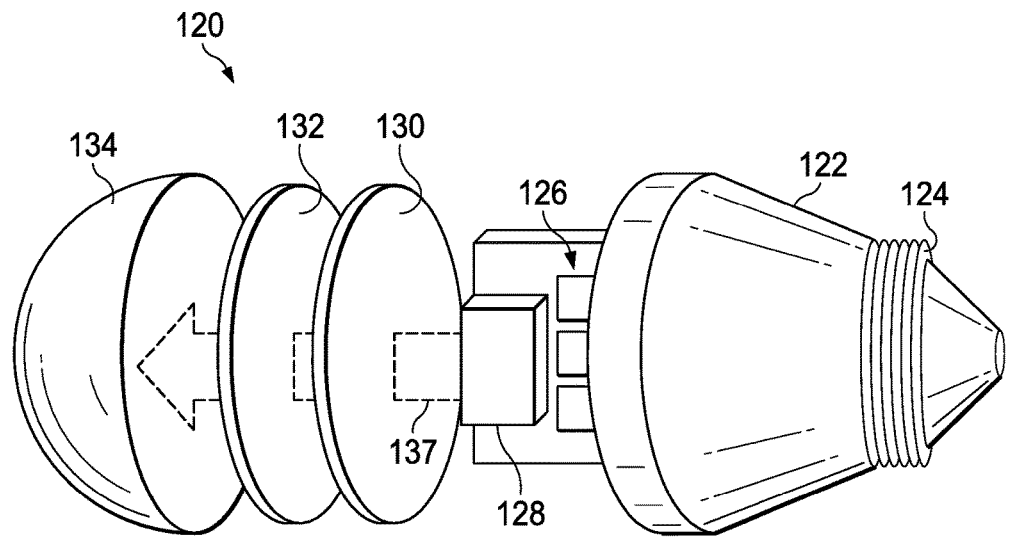
FIG. 1 is an exploded diagram of a smart bulb in accordance with this disclosure.

Referring initially to FIG. 1, a smart bulb 120 includes a bulb base 122 with a male plug 124 at its smaller diameter end and being open at its larger diameter end. It is noted that the male plug 124 is sized and dimensioned such that it fits in any selected standard light fixture (e.g. an E12 candelabra base, an E17 intermediate base, an E26 "standard" base, an E39 mogul base, etc), providing the ability of the smart bulb 120 to work with existing conventional light fixtures. A bulb shell 134 fits into the larger diameter end of the bulb base 122 and seals against the larger diameter end of the bulb base 122 to protect and contain control circuitry 126, an optical module 128, a phosphor plate 130, and an objective plate 132.

The optical module 128, under control of the control circuitry 126, generates a beam of collimated light, shown as laser beam 137, that is scanned across the phosphor plate 130 in a fixed scan pattern. The control circuitry 126 controls generation of the laser beam 137 by the optical module 128 so as to modulate the laser beam 137 as it is scanned across the phosphor plate 130 in the fixed scan pattern. When the laser beam 137 impinges upon the phosphor plate 130, the phosphor plate 130 emits light. The light emitted by the phosphor plate 130 is focused by the objective plate 132.

By modulation, it is meant that the laser beam 137 may be switched on and off by the control circuitry 126 so that it impinges on less than all locations of the phosphor plate 130 as it is scanned across the phosphor plate in the fixed scan pattern, or switches between two or more power levels such that it impinges on certain locations of the phosphor plate 130 with a higher intensity than that with which it impinges on other locations of the phosphor plate 130.

This modulation of the laser beam 137 is caused by the control circuitry 126 in response to received configuration data. The configuration data defines how the light produced by the phosphor plate 130 should appear, in terms of size, shape, and intensity. The control circuitry 126 determines a desired projection pattern that will result in the phosphor plate 130 producing the light as per the size, shape, and intensity defined by the configuration data, and modulates the intensity of the laser beam 137 differently during portions of the fixed scan pattern that coincide with the desired projection pattern than during portions of the fixed scan pattern that do not coincide with the desired projection pattern. As stated, this can mean that the optical module 128 generates the laser beam 137 at a given intensity during portions of the fixed scan pattern that coincide with the desired projection pattern, and does not generate the laser beam 137 during portions of the fixed scan pattern that do not coincide with the desired projection pattern. The result is the formation of a projection pattern by the laser beam 137 on the phosphor plate 130 (shown as 142 in FIG. 3).

It should be appreciated that the color of the laser beam 137 generated by the optical module 128, as well as the specific type or blend of phosphor used in the phosphor plate 130, may be selected so as to cause emission of specific wavelengths of light by the phosphor plate 130. For example, the laser beam 137 may be blue, and the phosphor may be organic, resulting in the emission of white light at a high luminous efficiency approaching 200 lm/W. As another example, the laser beam may be blue 137 and used together a phosphor that emits infrared light, resulting in the generation of infrared light.

Figure 2:
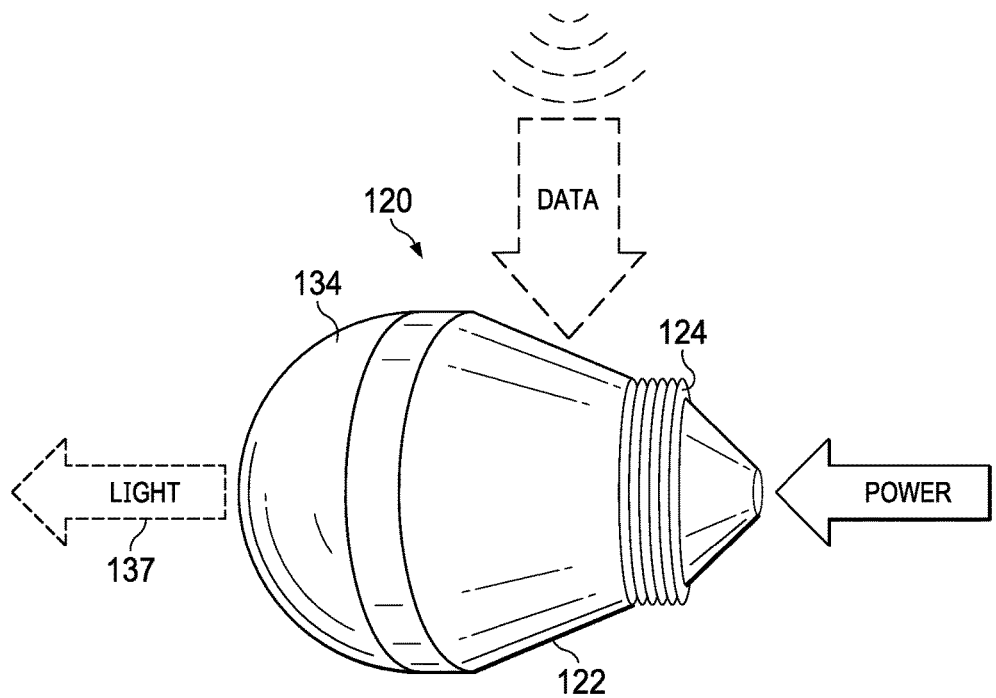
FIG. 2 is a side view of the smart bulb of FIG. 1 as assembled.

As shown in FIG. 2, the smart bulb 120 is powered through its male plug, and emits light through its bulb shell 134. The control circuitry 126, as will be explained, can wirelessly receive configuration data through a desired wireless data transmission standard (e.g. WiFi, Bluetooth, Z-wave, etc), and control the optical module 128 based upon that configuration data so as to effectuate a wide variety of functions.

Figure 3:
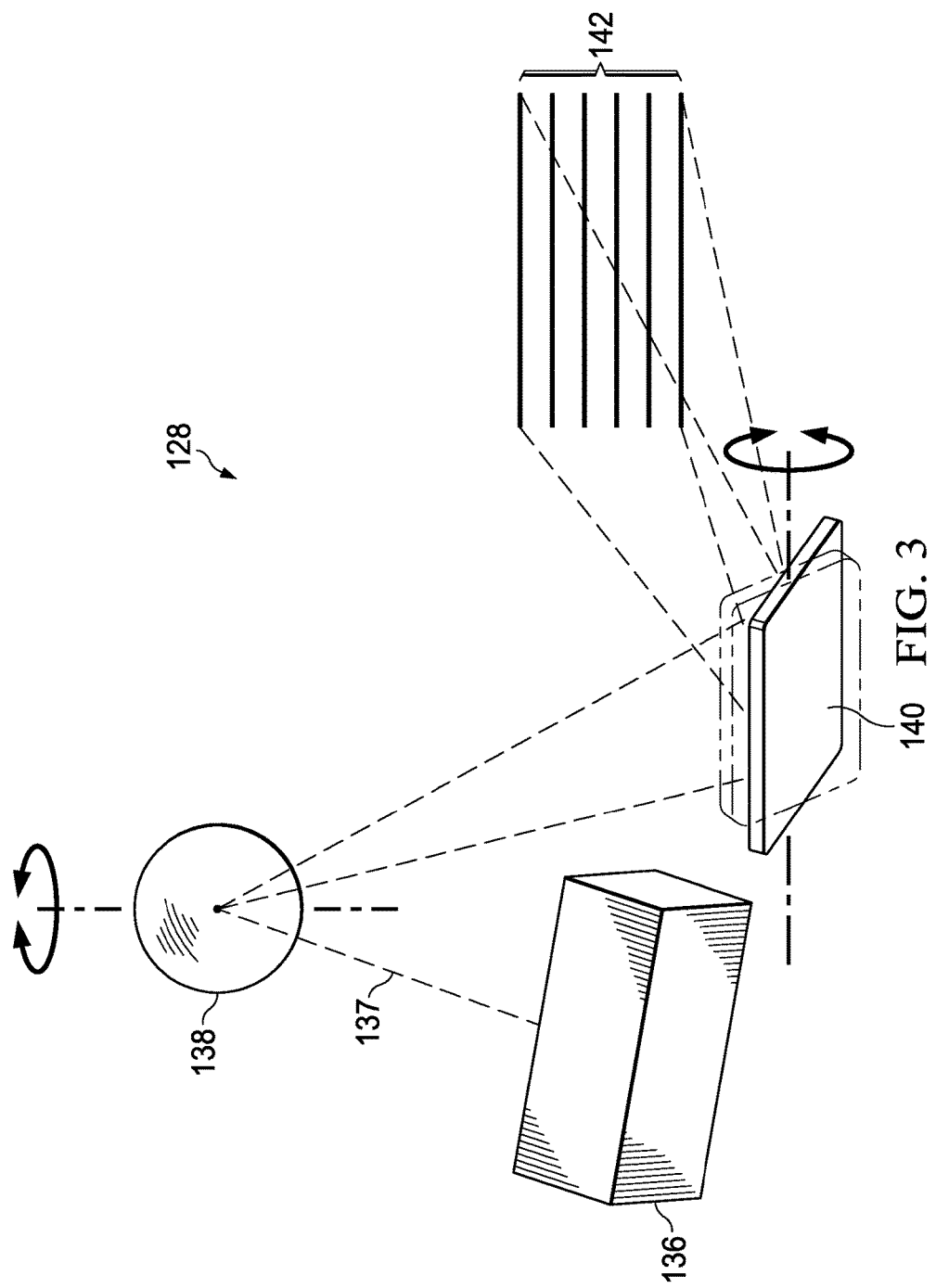
FIG. 3 is a block diagram of the scanning projector contained within the smart bulb of FIG. 1.

The optical module 128 itself is shown in FIG. 3, and includes a collimated light generator 136, mirror 138, and mirror 140. The collimated light generator 136 (e.g. one or more laser diodes) emits a beam of collimated light, such as laser beam 137, impinging upon mirror 138 which oscillates about its vertical axis so as to effectuate scanning of the laser beam 137 in a horizontal direction. The mirror 138 oscillates under control of the control circuitry 126. The laser beam 137, as reflected by the mirror 138, impinges upon the mirror 140, which oscillates about its horizontal axis so as to effectuate scanning of the laser beam 137 in a vertical direction. The mirror 140 oscillates also under control of the control circuitry 126. The oscillation of the mirror 140 is considered to be slow axis oscillation, and has a frequency which is less than that of the mirror 138, which is considered to be fast axis oscillation.

The combination of movements of the mirrors 138 and 140 results in scanning of the laser beam 137 in a constant scan pattern, through one or more optics (not shown in FIG. 3, but indicated as 139 in FIG. 4) across the phosphor plate 130.

Although the optical module 128 shown utilizes two uniaxial mirrors 138 and 140 to achieve two dimensional scanning of the laser beam 137, a single biaxial mirror may be used instead. In some instances, a single uniaxial mirror may instead be used.

Figure 4:
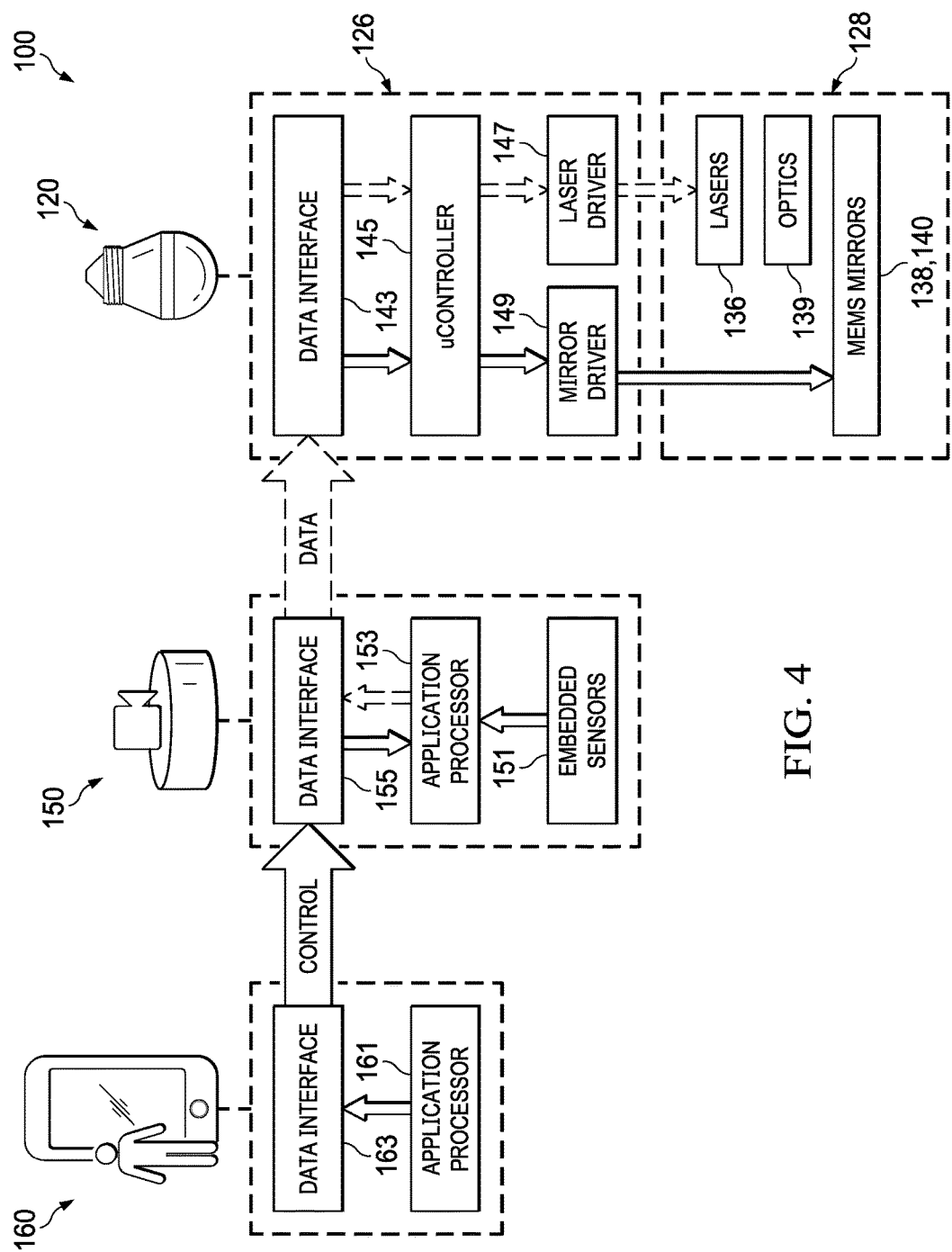
FIG. 4 is a detailed block diagram of a smart lighting system (including the smart bulb of FIG. 1) in accordance with this disclosure.

Subcomponents of the control circuitry 126, as well as other components and subcomponents of a smart lighting system 100 utilizing the smart bulb 120, are now described with reference to FIG. 4.

The control circuitry 126 includes a data interface 143 that enables bi-directional or uni-directional wireless data communications. The data interface 143 wirelessly receives the configuration data and passes that configuration data to controller 145, which processes the configuration data, and based thereupon, sends appropriate control signals to the laser driver 147 and the mirror driver 149 to respectively effectuate the moving of the mirrors 138 and 140 in the fixed scan pattern and the modulation of the collimated light generator 136 to form the desired projection pattern.

A system controller (or smarthub) 150 is spaced apart from, but local to, the smart bulb 120. For example, the system controller 150 may be located in the same house or same office as the smart bulb 120. The system controller 150 includes a data interface 155 for bi-directional or uni-directional wireless communication with the data interface 143 of the control circuitry 126. The data interface 155 receives configuration data, and the application processor 153 processes the configuration data prior to sending the configuration data to the data interface 143 of the smart bulb 120.

The application processor 153 also may receive sensor data from one or more optional embedded sensors 151 (e.g. cameras, proximity sensors, ambient light sensors, temperature sensors, time of flight ranging sensors, etc), and may also process or alter the configuration data in response to the sensor data. In some cases, the application processor 153 may, without receipt of configuration data, generate configuration data on its own in response to the sensor data.

A mobile wireless communications device 160, such as a smartphone, tablet, smartwatch, or smarthub panel, receives user input, processes the user input via its application processor 161 to form the configuration data, and sends the configuration data wirelessly, using its data interface 163, to the data interface 155 of the system controller 150. The mobile wireless communications device 160 may execute one or more applications, via the application processor 161, that prompt the user for the user input.

As explained earlier with reference to FIG. 3, through the combination of movements of the mirrors 138 and 140 as well as the modulation of the laser beam 137, the laser beam 137 impinges upon the phosphor plate 130 in the projection pattern 142, causing emission of light by the portions of the phosphor plate 130 impinged upon by the laser beam 137. Since the portions of the phosphor plate 130 impinged upon by the laser beam 137 emit light, while the portions of the phosphor plate 130 not impinged upon by the laser beam 137 do not emit light, it should be appreciated that this enables for a wide variety of novel functionality not previously available with conventional lighting systems. Various exemplary modes of operation will now be described below.

For example, a dimming mode of operation is shown in FIG. 5. Here, the user input provided to the mobile wireless communications device 160 may result in configuration data, that when processed by the application processor 153 of the system controller 150, causes a change in the intensity of the generated light. This can be seen where the light produced by the bulb 120c is brighter than the light produced by the bulb 120b, which in turn is greater than the light produced by the bulb 120a. This dimming is accomplished by the configuration data causing the controller 145 to instruct the laser driver 147 to reduce the intensity of the laser beam 137 produced.

In some cases, instead of the dimming being performed for the entire projection pattern 142 formed by the laser beam 137 on the phosphor plate 130, the dimming may be performed differently at different parts projection pattern 142, so that the light produced may be dimmer in certain parts of the projection pattern 142 than in others.

As another example, a beam spot size alteration mode of operation is shown in FIG. 6. Here, the user input provided to the mobile wireless communications device 160 may result in the generation of configuration data, that when processed by the application processor 153 of the system controller and sent to the smart bulbs 120a, 120b, 120c, instructs the size of the cone of light produced to be altered. As shown in FIG. 6, the cone of light produced by smart bulb 120c has a larger base than that produced by smart bulb 120b (but is centered about the same point), which in turn produces a cone of light having a larger base than that produced by smart bulb 120a (but is also centered about the same point). This beam spot size alteration is accomplished by the configuration data causing the controller 145 to instruct the laser driver 147 to modulate the laser beam 137 appropriately such that the dimensions of the projection pattern 142 are reduced, resulting in less than the full phosphor plate 130 producing light.

In addition to changing the size of the projection pattern 142, the shape of the projection pattern 142 may be changed such that the shape of the light itself is produced. For example, the projection pattern 142 may be rectangular, thereby producing light in the shape of a trapezoidal prism with a beam spot in the shape of a rectangle. This pattern forming allows the formation of multiple beams or spots of varying shapes.

Figure 7:
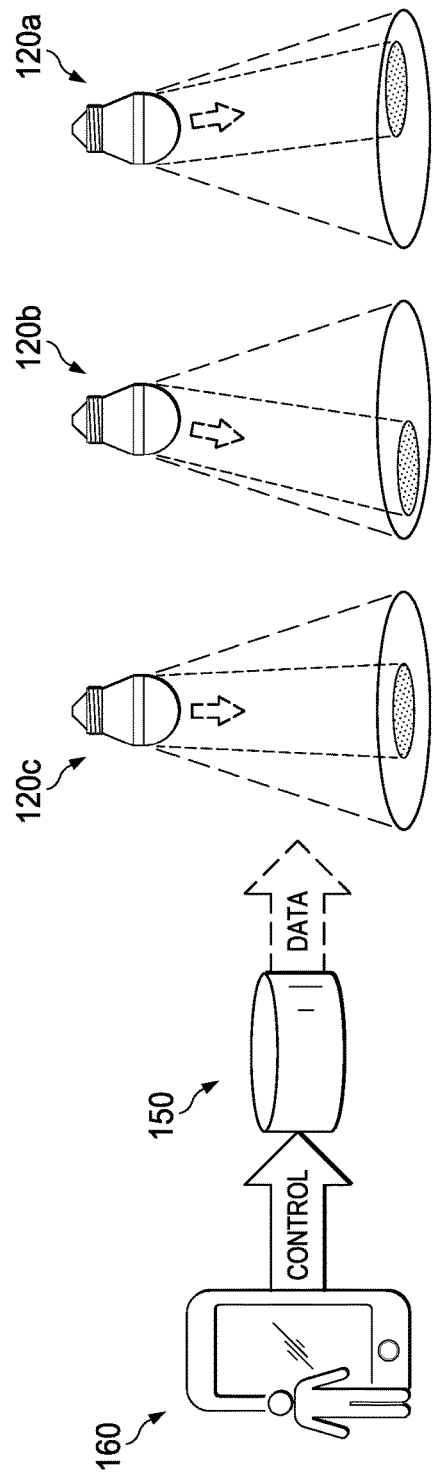
FIG. 7 is a diagram of the smart lighting system of FIG. 4 when operating in a beam spot position alteration mode.

As another example, a beam spot position alteration mode is shown in FIG. 7. Here, the user input provided to the mobile wireless communications device 160 may result in configuration data, that when processed by the application processor 153 of the system controller and sent to the smart bulbs 120a, 120b, 120c, results in alteration of the path of the cone of light produced (and thus alteration of the position of the beam spot produced). This can be seen in FIG. 7, where the base of the cone of light produced by smart bulb 120c is centered about the smart bulb 120c, the base of the cone of light produced by smart bulb 120b is centered to the left of smart bulb 120b, and the base of the cone of light produced by smart bulb 120a is centered to the right of smart bulb 120a. This beam spot position alteration is accomplished by the configuration data causing the controller 145 to instruct the laser driver 147 to modulate the laser beam 137 appropriately such that the projection pattern 142 formed on the phosphor plate 130 changes position on the phosphor plate 130.

It should be appreciated that this also allows, in conjunction with the teachings above, the creation of multiple beams of varying shapes, and the adjustment of the position of those beams with respect to one another. In some cases, the position of multiple beams may be continuously adjusted on the fly so that the beam spots are continuously moving, or moving in a specified pattern.

Figure 8:
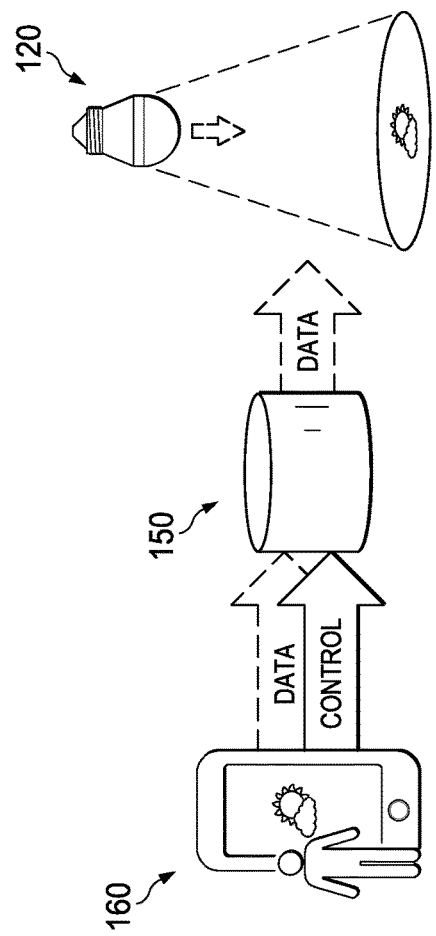
FIG. 8 is a diagram of the smart lighting system of FIG. 4 when operating in an image display mode.

An image display mode is now described with reference to FIG. 8. Here, the user input provided to the mobile wireless communications device 160 may result in configuration data, that when processed by the application processor 153 of the system controller and sent to the smart bulbs 120a, 120b, 120c, causes the light produced to display images, such as artistic images, geometric shapes, or information. This is shown in FIG. 8, where the light produced by smart bulb 120 displays images containing information, such as text, icons, infographs, and pictographs. This image display is accomplished by the configuration data causing the controller 145 to instruct the laser driver 147 to modulate the laser beam 137 appropriately such that the projection pattern 142 formed on the phosphor plate 130 contains the image or images to be displayed.

Figure 10:
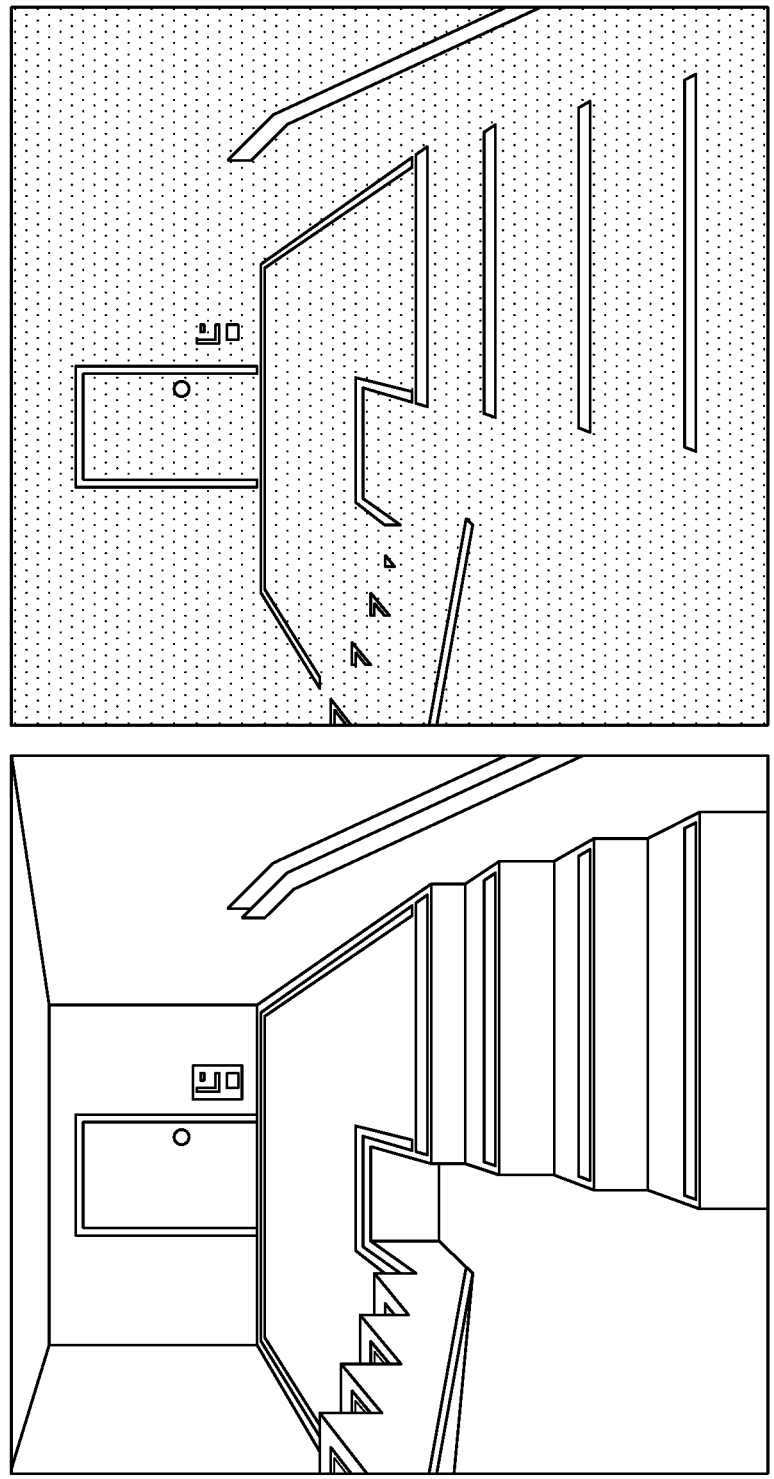
FIGS. 10-11 illustrate the use of the smart lighting system of FIG. 4 in a safety lighting system for a commercial building.
Figure 11:
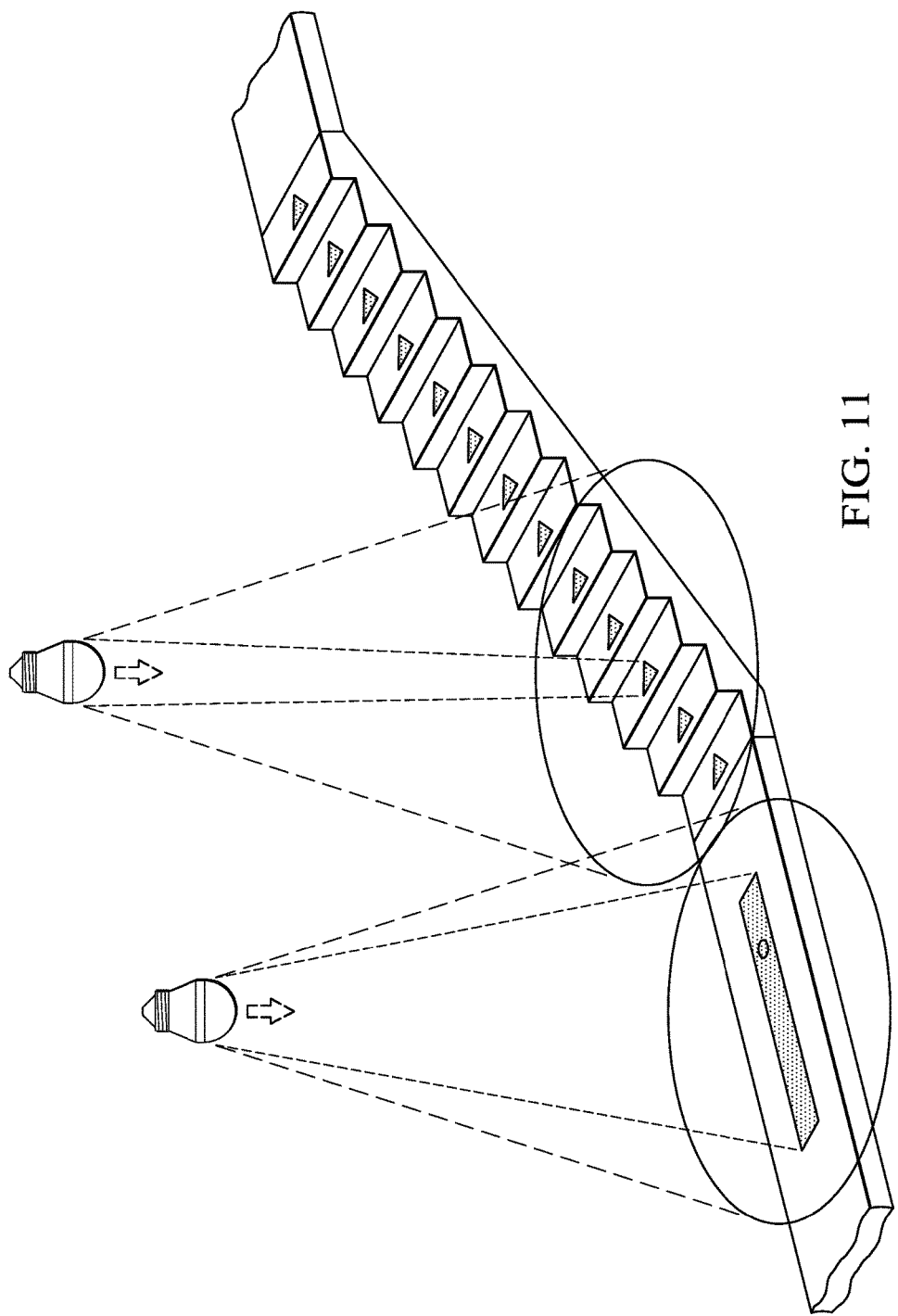

The images displayed may be to highlight certain elements in the environment, such as in the examples shown in FIG. 10, where the information displayed is the outlines of a room, the location of stair steps and the outline of a door. The images displayed may also be directions, such as the arrows shown in FIG. 11 indicating the path individuals should follow. It should be appreciated that the two examples shown in FIG. 10-11 are particularly useful in emergency lighting systems.

Figure 9:
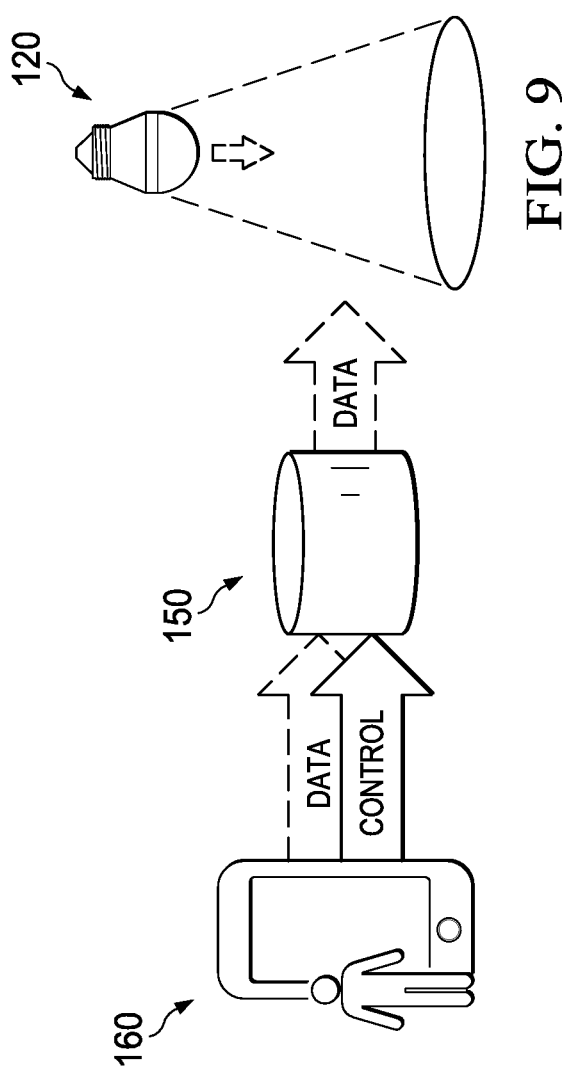
FIG. 9 is a diagram of the smart lighting system of FIG. 4 when operating in a pattern display mode.

A pattern display mode is now described with reference to FIG. 9. Here, the user input provided to the mobile wireless communications device 160 may result in configuration data, that when processed by the application processor 153 of the system controller and sent to the smart bulbs 120a, 120b, 120c, that causes the light to display a fixed or moving pattern. This can be seen in FIG. 9, where the light produced by smart bulb 120 is displaying a pattern.

As can be seen, none of the various modes of operation described above require physical movement of the smart bulb 120 itself, or of the phosphor plate 130 itself. Thus, it is appreciated that the bulb described is capable of installation into conventional light fixtures, yet provides those fixtures with the capability of projecting an adjustable position light, without the fitting of a mechanical movement system.

As was explained above, the phosphor plate 130 and collimated light generator 136 may be selected such that infrared light is produced when the laser beam 137 impinges on the phosphor plate 130. Therefore, the smart bulb 120 may be used as a heater. The same modes described above relevant to visible light may be used for the production of infrared light.

For example, a heat dimming mode is described with reference to FIG. 12. Here, the user input provided to the mobile wireless communications device 160 may result in configuration data, that when processed by the application processor 153 of the system controller and sent to the smart bulbs 120a, 120b, 120c, causes the temperature of the heat produced to change. This can be seen in FIG. 12, where the heat produced by the smart bulb 120c is greater than the heat produced by the smart bulb 120b, which in turn is greater than the heat produced by the smart bulb 120a. This temperature adjustment is accomplished by the configuration data resulting in the controller 145 instructing the laser driver 147 to reduce the intensity of the laser beam 137 produced, yielding generation of reduced intensity infrared heat by the phosphor plate 130.

A heat beam size alteration mode is described with reference to FIG. 13. Here, the user input provided to the mobile wireless communications device 160 may result in configuration data, that when processed by the application processor 153 of the system controller and sent to the smart bulbs 120a, 120b, 120c, results in the size of the heat beam produced being altered. This can be seen in FIG. 13, where the heat beam produced by smart bulb 120c is in the shape of a cone having a larger base than that of the cone produced by smart bulb 120b (but is centered about the same point), which in turn has a larger base than that of the cone produced by bulb 120a (but is also centered about the same point). This heat beam size alteration is accomplished by the configuration data causing the controller 145 to instruct the laser driver 147 to modulate the laser beam 137 appropriately such that the dimensions of the projection pattern 142 are reduced, resulting in less than the full phosphor plate 130 producing infrared light.

Figure 14:
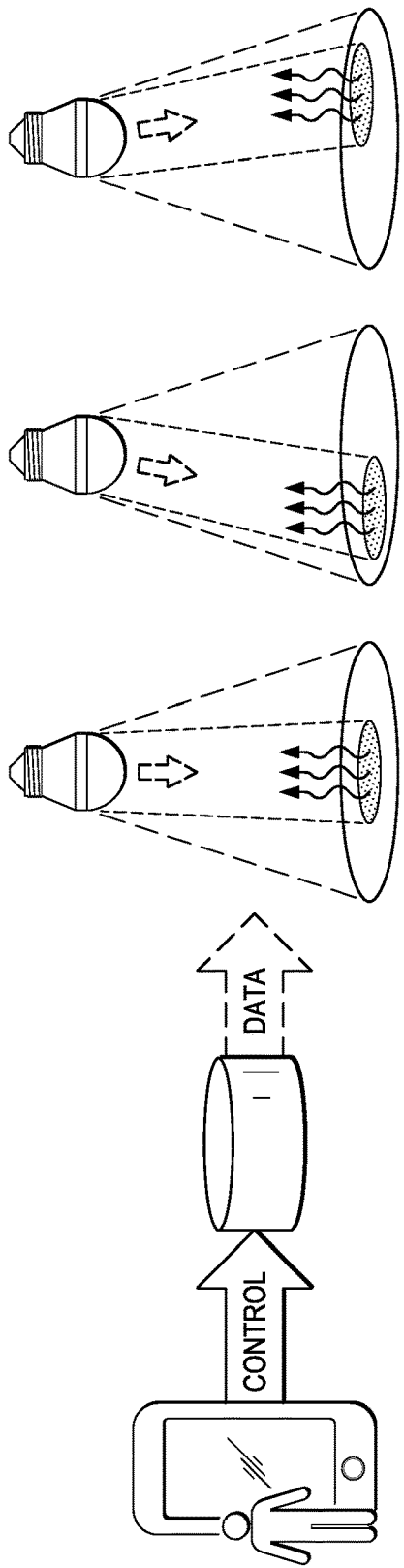
FIG. 14 is a diagram of the smart lighting system of FIG. 4, operating as a heater, when operating in a heat beam direction mode.

A heat beam direction mode is now described with reference to FIG. 14. Here, the user input provided to the mobile wireless communications device 160 may result in configuration data, that when processed by the application processor 153 of the system controller and sent to the smart bulbs 120a, 120b, 120c, results in direction of the heat beam in a specific direction. This can be seen in FIG. 14, where the heat beam produced by bulb 120c is centered about the bulb 120c, the heat beam produced by bulb 120b is centered to the left of bulb 120b, and the heat beam produced by bulb 120a is centered to the right of bulb 120a. This heat beam direction is accomplished by the configuration data causing the controller 145 to instruct the laser driver 147 to modulate the laser beam 137 appropriately such that the projection pattern 142 formed on the phosphor plate 130 changes position on the phosphor plate 130.

As explained, in the case of the application processor 153 processing the configuration data based on sensor data, this processing may be performed on the fly and continuously. Therefore, dimming, light beam movement, light beam shape changing, information display, or pattern display may change based upon the sensor data. For example, the application processor 153 may modify the configuration data so as to increase the intensity of the light produced based upon detection of one or more persons in the environment (via proximity sensor, camera, time of flight sensor, etc), with the intensity being increased (from none, or from a lower setting, to a higher setting or a maximum setting) when there are persons in the environment as opposed to when persons are not in the environment. Similarly, light beam movement (alone or in combination with splitting the light beam into multiple light beams) may be used so the light is aimed toward individuals in the environment, and tracks those individuals as they move throughout the environment. Information display may begin or change based upon presence of individuals, or certain individuals, in the environment, and may even be customized such that information set as being desired by a certain individual may be displayed when that person is present in the environment, or when that person is the closest person to the sensors—the individual may be identified via facial recognition or body recognition, using a camera as a sensor. In addition, any number of such sensors may be present, and the configuration data may be based upon a fusion of sensor data (e.g. if person A is present and the ambient light is below level X, if person B is present and less than 10 ft from the sensor, etc) such that changes in the configuration data are made based upon multiple conditions in the sensor data being present.

The desired projection pattern formed by the laser beam 137 on the phosphor plate 130 may be continuously moving, adjusting, or changing, so as to effectuate continuous changing of the light produced by the phosphor plate 130.

In some applications, the system controller 150 need not be present, and that the smart bulb 120 may directly wirelessly communicate with the mobile wireless communications device 160, or may wirelessly communicate with the mobile wireless communications device 160 through the internet. In addition, the mobile wireless communications device 160 or the controller 145 of the smart bulb 120 may perform all configuration data processing described herein in some applications.

The invention claimed is:
1. A lighting system, comprising:
  a bulb comprising:
    a phosphor plate;
    a scanning projector configured to emit a beam of collimated light and scan the beam of collimated light across the phosphor plate to cause emission of infrared light by the phosphor plate to thereby modulate temperature of an environment in which the bulb is present; and
    control circuitry configured to wirelessly receive configuration data and to modulate the beam of collimated light during scanning so that the scanning forms a projection pattern on the phosphor plate;
  a temperature sensor configured to detect temperature in the environment in which the bulb is present; and
  a control system spaced apart from the bulb and configured to read data about the temperature from the temperature sensor, generate the configuration data so as to cause the control circuitry to adjust operation of the scanning projector based upon the data about the temperature, and wirelessly send the configuration data to the control circuitry of the bulb.

2. The lighting system of claim 1, wherein the bulb further comprises:
  a housing carrying the phosphor plate, the scanning projector, and the control circuitry, the housing having a first end within which the phosphor plate is exposed, the housing having a second end terminating in a male light bulb connector; and
  an at least semitransparent shell sealed to the housing and covering the phosphor plate, scanning projector, and control circuitry.

3. The lighting system of claim 1, wherein the phosphor plate is comprised of an inorganic phosphor.

4. The lighting system of claim 1, wherein the scanning projector comprises:
  at least one collimated light emitter; and
  a mirror apparatus including at least one mirror upon which the beam of collimated light impinges, the mirror apparatus configured to scan the beam of collimated light across the phosphor plate.

5. The lighting system of claim 4, wherein the at least one collimated light emitter further comprises a blue laser diode.

6. The lighting system of claim 4, wherein the at least one mirror comprises a biaxially movable mirror.

7. The lighting system of claim 4, wherein the mirror apparatus includes at least one first uniaxially movable mirror upon which the beam of collimated light impinges, and at least one second uniaxially movable mirror upon which the beam of collimated light impinges after reflection by the at least one first uniaxially movable mirror.

8. The lighting system of claim 4, wherein the control circuitry includes a driver to drive the at least one collimated light emitter and a mirror driver configured to drive the mirror apparatus.

9. The lighting system of claim 1, wherein the modulation results in a majority of a surface of the phosphor plate facing the scanning projector having the beam of collimated light scanned thereacross at a first intensity.

10. The lighting system of claim 1, wherein the control circuitry operates to select a size and/or shape and/or content of the projection pattern.

11. The lighting system of claim 1, wherein the modulation results in a majority of a surface of the phosphor plate facing the scanning projector having the beam of collimated light scanned thereacross at a first intensity and a minority of the surface of the phosphor plate facing the scanning projector having the beam of collimated light scanned thereacross at a second intensity below the first intensity.

12. The lighting system of claim 1, wherein the modulation results in portions of a surface of the phosphor plate facing the scanning projector having the beam of collimated light scanned thereacross at a first intensity while other portions have the beam of collimated light scanned thereacross at a second intensity below the first intensity.

13. The lighting system of claim 1, wherein the control circuitry is configured to cause reduction of an intensity of the beam of collimated light so as to reduce intensity of infrared light emission by the phosphor plate.

14. The lighting system of claim 1, further comprising a control system spaced apart from the bulb and configured to wirelessly send the configuration data to the control circuitry of the bulb.

15. The lighting system of claim 14, further comprising a mobile wireless communications device configured to wirelessly send the configuration data to the control system.

16. The lighting system of claim 14, further comprising a light sensor configured to detect ambient lighting conditions in the environment in which the bulb is present; and wherein the control system is configured to read data about the ambient lighting conditions from the light sensor, and to cause adjustment operation of the scanning projector based thereupon.

17. The lighting system of claim 16, wherein the control system is configured to adjust operation of the scanning projector based upon the ambient lighting conditions by changing intensity of the beam of collimated light.

18. The lighting system of claim 16, wherein the control system is configured to cause adjustment of operation of the scanning projector based upon the ambient lighting conditions by changing the modulation.

19. The lighting system of claim 14, further comprising a camera configured to detect ambient lighting conditions in the environment in which the bulb is present; and wherein the control system is configured to read data about the ambient lighting conditions from the camera, and cause adjustment of operation of the scanning projector based thereupon.

20. The lighting system of claim 19, wherein the control system is configured to cause adjustment of operation of the scanning projector based upon the ambient lighting conditions by changing intensity of the beam of collimated light.

21. The lighting system of claim 19, wherein the control system is configured to cause adjustment of operation of the scanning projector based upon the ambient lighting conditions by changing the modulation.

22. The lighting system of claim 14, further comprising a camera configured to locate at least one target in the environment in which the bulb is present; and wherein the control system is configured to cause adjustment of operation of the scanning projector based upon position of the at least one target in the environment.

23. The lighting system of claim 22, wherein the control system is configured to cause adjustment of operation of the scanning projector based upon position of the at least one target in the environment as the target moves through the environment.

24. The lighting system of claim 22, wherein the projection pattern results in emission of infrared light by portions of the phosphor plate impinged upon by the beam of collimated light at a first intensity toward a selected area in the environment in which the bulb is present.

25. A lighting system, comprising:
a bulb comprising:
  a phosphor plate;
  a scanning projector configured to emit a beam of collimated light and scan the beam of collimated light across the phosphor plate to thereby cause emission of infrared light by portions of the phosphor plate impinged upon by the beam of collimated light to thereby modulate temperature of an environment in which the bulb is present; and
  control circuitry configured to wirelessly receive configuration data and to modulate the beam of collimated light in a desired intensity pattern based upon the configuration data;
a control system spaced apart from the bulb and configured to process initial configuration data, and wirelessly send the configuration data to the control circuitry of the bulb;
wherein the control system comprises:
  a data interface configured to wirelessly receive the initial configuration data;
  an application processor configured to process the initial configuration data so as to change the desired intensity pattern; and
  at least one environmental sensor configured to send environmental information to the application processor, the environmental information being an ambient temperature of the environment in which the bulb is present;
  wherein the application processor is configured to change the desired intensity pattern based upon the environmental information.

26. The lighting system of claim 25, further comprising a mobile wireless communications device configured to wirelessly send the initial configuration data to the data interface.

27. The lighting system of claim 25, wherein the environmental information further comprises ambient lighting condition in the environment in which the bulb is present, and/or a target is present in the environment in which the bulb is present.

28. The lighting system of claim 25, wherein the desired intensity pattern results in emission of light from the phosphor plate in a direction indicated by the configuration data.

* * * * *